Oct. 13, 1942.    C. E. PARKER    2,298,307
TOP STRUCTURE FOR GASEOUS FUEL COOK STOVES
Filed March 20, 1940    2 Sheets-Sheet 1
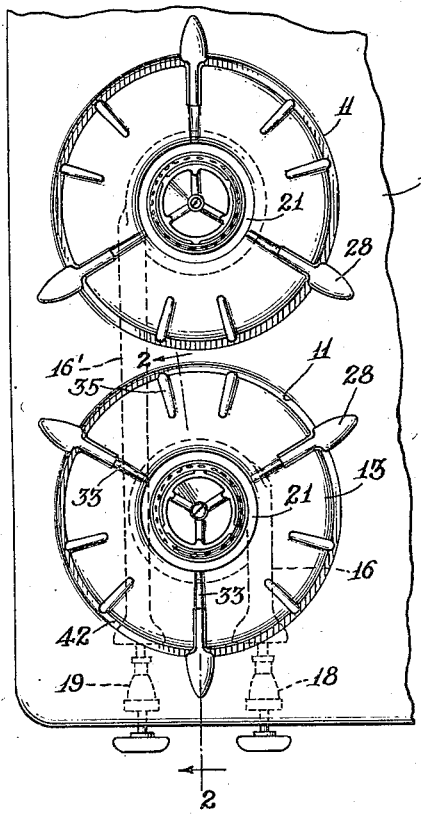
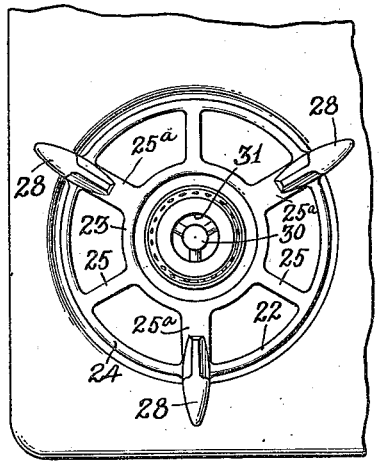
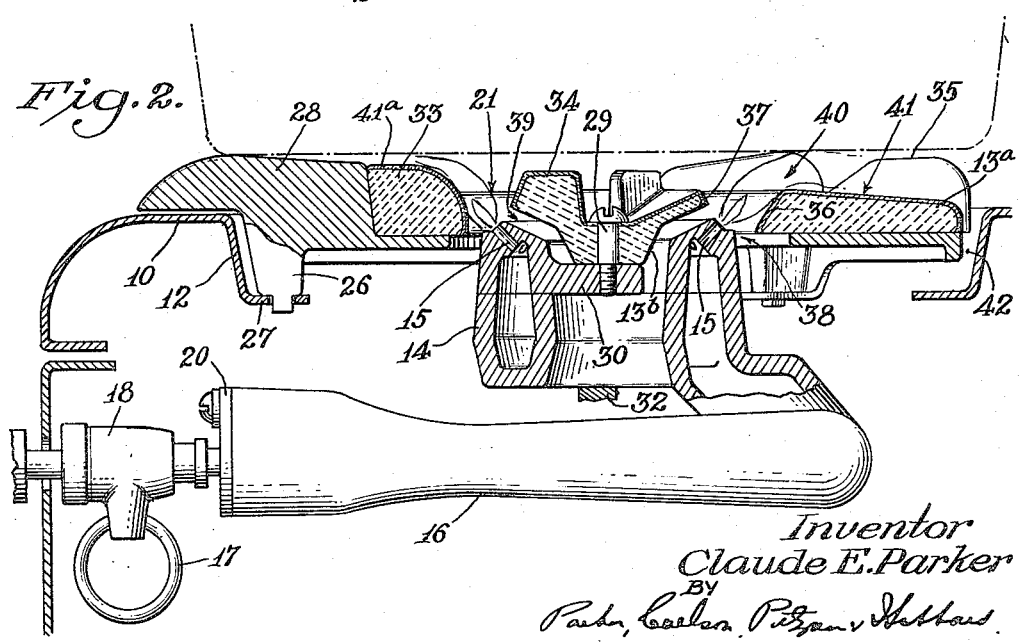
Inventor
Claude E. Parker Oct. 13, 1942.  C. E. PARKER  2,298,307
TOP STRUCTURE FOR GASEOUS FUEL COOK STOVES
Filed March 20, 1940  2 Sheets-Sheet 2
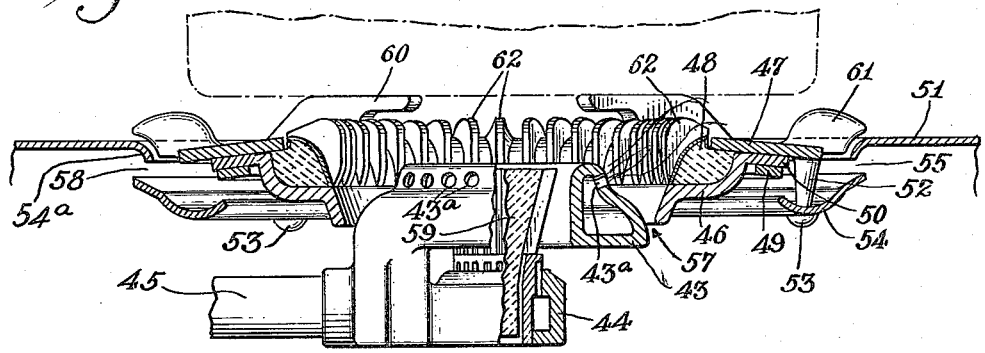
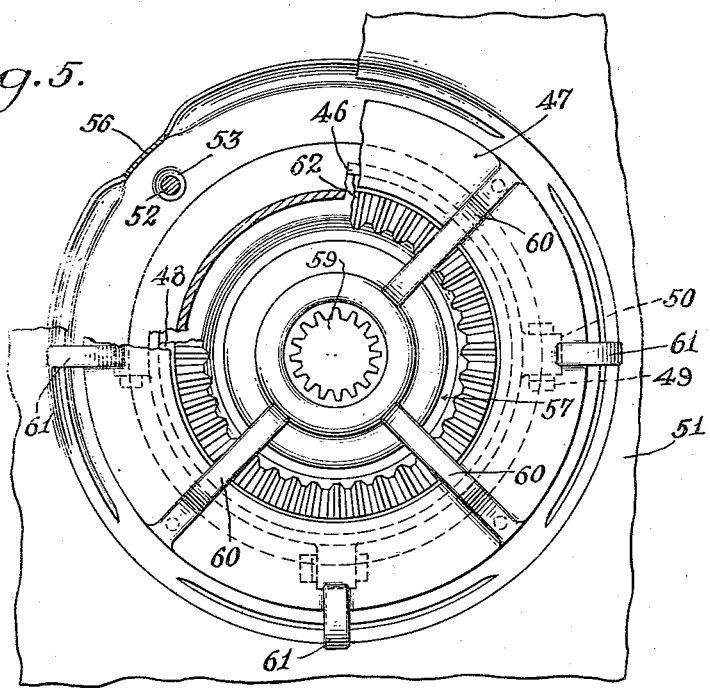
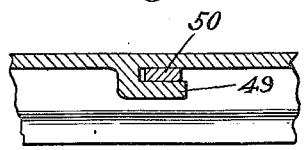
Inventor
Claude E. Parker
Attorneys.

Patented Oct. 13, 1942

2,298,307

UNITED STATES PATENT OFFICE 2,298,307

TOP STRUCTURE FOR GASEOUS FUEL COOK STOVES

Claude E. Parker, Chicago, Ill., assignor to Gas Products Corporation, Chicago, Ill., a corporation of Illinois Application March 20, 1940, Serial No. 324,901

5 Claims. (Cl. 126—39)

The invention pertains to cooking top structures for gaseous fuel cook stoves and has for its general aim the provision of a cooking top of greatly enhanced appearance, with a more effectual application of the heat of the burners to the cooking utensils.

With this aim in view, one object of the invention is to provide a cooking top structure simulating in appearance a closed top overlying and concealing the underlying burners but providing for the direct application of the heat of the burner flames to the cooking utensils in a manner such as to confine the heat of the flames to the bottoms of the utensils while minimizing loss of heat by dissipation to the stove structure and to the surrounding atmosphere.

Another object is to provide an improved cooking top structure embodying a heat confining hearth or wall having apertures therein of sufficient size to permit of the passage therethrough of flames of an underlying burner and constituting a heat barrier preventing downward reflection of the heat of the burner flames and serving to confine the heat of the flames closely to the bottom of an overlying cooking utensil.

A further object is to provide a hearth of the character indicated made of a fused heat-insulating material capable of withstanding the intense heat of the flames issuing from the underlying burner, close to the surface of the hearth, and providing a heat storing medium sufficiently slow in its heat absorbing capacity as not to interfere with a rapid start of the cooking operation and yet adapted when heated during a prolonged cooking operation, to give up its heat slowly after the burner is turned off, thereby serving to keep the contents of the utensil hot for a substantial period of time.

A further object is to provide an improved top structure including a hearth coacting with a burner and the bottom of an overlying cooking utensil to form a combustion chamber having a restricted outlet so disposed relative to the fuel emission means of the burner as to receive the highly heated tip portions of the burner flames while confining the latter to the bottom of the utensil.

The objects of the invention thus generally stated together with other and ancillary advantages are attained by the construction and arrangement shown by way of illustration in the accompanying drawings and forming part hereof, wherein Figure 1 is a fragmentary plan view of a cooking top structure embodying my invention.

Fig. 2 is a fragmentary vertical sectional view taken approximately in the plane of line 2—2 of Fig. 1 but on an enlarged scale.

Fig. 3 is a fragmentary plan view showing a metallic cradle supported in the top panel of the stove, which cradle constitutes a part of the hearth structure.

Fig. 4 is a fragmentary vertical sectional view illustrating a modified form of construction.

Fig. 5 is a fragmentary plan view of the form shown in Fig. 4.

Fig. 6 is a fragmentary sectional view illustrating a detail of construction.

My improved top structure comprises a top panel 10 preferably made from a thin sheet of metal and formed with spaced openings 11 bordered by depending marginal flanges 12. Supported in each of the openings of the panel is an auxiliary top wall constituting a hearth and generally designated 13, and underlying each hearth is a gaseous fuel burner 14. The burners herein shown are of the so-called round type. Each comprises an annular body having fuel emission ports 15. The front burner (Fig. 1) is supplied by a mixing tube 16 into which gaseous fuel is discharged from a manifold 17 through the medium of a valve 18. The rear burner is similarly supplied by a mixing tube 16' and valve 19. Both mixing tubes are equipped at their forward ends with air shutters 20 in the conventional manner.

In the present instance the hearth comprises an outer annular section or ring 13ᵃ and an inner section or cap 13ᵇ spaced apart to form an annular opening for the passage of flames from the burner 14. In the preferred embodiment, the two sections of the hearth are made of fused heat-insulating material such, for example, as a ceramic material available on the market and known as "Parkerite."

To carry the outer or ring section 13ᵃ a metallic cradle 22 is employed (Figs. 2 and 3). This cradle may be of any suitable or preferred construction. As herein shown it comprises two concentric rings 23 and 24 connected by radial arms 25 and 25ᵃ (Fig. 3). The cradle has depending bosses 26 adapted to rest upon inwardly projecting lugs 27 formed integral with the depending flange 12 of the top panel 10, a suitable number of such lugs being provided at circumferentially spaced intervals. As herein shown, the ring 13ᵃ is made in one piece although it may if desired be made in two or more segments; and the ring is suitably notched to accommodate utensil supports 28 cast integral with the cradle.

The central cap section 13ᵇ of the hearth is in the present instance mounted directly upon the burner head 14, being secured thereto by means of a screw 29 anchored in the center of a spider 30 (Fig. 3) within the annular burner body and providing apertures 31 for the passage of secondary air. The burner itself may be supported in any convenient manner, a supporting rod 32 being herein shown for that purpose.

The utensil supports 28 as herein shown are three in number, being equidistantly spaced apart. As seen in Figs. 1 and 2, the outer metallic portion of each of the supports is alined with a ceramic finger 33 constituting an inward extension of the support. To insure the support of very small utensils the center cap 13ᵇ of the hearth may be formed with ribs 34 also preferably alined with the ceramic fingers 33 and the metallic supporting fingers 28. Between the supports 28, 33, the outer ring 13ᵃ of the hearth is preferably provided with short auxiliary ribs 35 having their upper surfaces disposed in a plane slightly below the tops of the fingers 33.

It is an important function of the hearth 13 to provide in cooperation with the main top panel, a substantially closed top wall effectually concealing the underlying burners and other unsightly parts, thereby enhancing the appearance of the stove, and at the same time providing for a more effectual application of the heat of the burners to the cooking utensils by confining the flames immediately beneath the utensils, avoiding dissipation of such heat to the stove structure and surrounding atmosphere. With this in view it will be observed that the hearth provides a generally horizontal wall which is supported in an opening in the top panel with its upper surface substantially in the plane of the panel, and which is apertured for the passage of the burner flames centrally of the hearth for direct application to the bottom of a utensil a which in the proportions shown in Fig. 2 would be of good size, as for example nine inches in diameter.

The fuel emission ports 15 of the burner are inclined so that the burner flames project upwardly and somewhat outwardly, and the outer ring section 13ᵃ is shaped to form an upwardly and outwardly inclined annular surface 36 spaced outwardly from the ports 15 and from the outer peripheral edge 37 of the center cap section 13ᵇ. Between these annular surfaces 36 and 37 is thus formed an annular space for the reception and expansion of the burner flames.

The bottom of the annular space thus formed has an air inlet in the form of a slot 38 for supplying secondary air to the undersides of the flames, said slot being formed between the lower inner edge of the ring section 13ᵃ and the adjacent side of the burner body. To supply secondary air to the top sides of the flames, the center cap section is formed with a central boss so as to space the peripheral portion of the underside of the cap from the upper face of the burner body and form therewith an upwardly and outwardly inclined annular slot 39 terminating at its outer edge immediately above the fuel ports 15, said slot being supplied with air through the openings 31 in the spider 30 of the cradle.

The annular inclined surface 36 of the outer ring section terminates at its upper edge close to the bottom of the utensil resting on the supports 28, 33 so as to coact with the utensil in forming a restricted annular outlet 40, it being observed that this outlet is disposed sufficiently close to the fuel ports 15 so that the outer portions of the flames issuing from the burner project into the outlet; and from such upper edge of the surface 36, the outer ring 13ᵃ has a top face 41 of substantial radial width extending outwardly and preferably somewhat downwardly, terminating adjacent the edge of the opening in the top panel. The top face of the center cap section is disposed in approximately the same plane as the upper edge of the annular edge of the inner surface 36 of the outer section so that although the burner proper is effectually covered, the entire bottom of the cooking utensil is exposed.

With the flames projecting upwardly and outwardly, the annular surface 36 of the outer ring section becomes heated by the lapping flames to an extremely high temperature, and this heat is reflected and radiated inwardly toward the center of the utensil above the center cap. Moreover, a central "cold spot" is avoided by reason of the fact that the restricted supply of air rising through the center of the burner body is deflected outwardly immediately above the flames.

It will be understood that while the hearth as herein shown is composed of separate inner and outer sections, it may, if desired, be otherwise constructed. For example, it may be a unitary structure as in the case of the hearth shown in my copending application Serial No. 272,984, filed May 11, 1939. In any case, it is important that the hearth be so constructed as to provide between it and the bottom of the overlying utensil a vertically shallow combustion space for confining a blanket of burning gases immediately beneath the utensil.

In the present embodiment the restricted outlet 40 is disposed relatively close to the center of the burner so as to be effective in the case of utensils of comparatively small size. Upon leaving the outlet the burning gases pass outwardly above the sloping top surface 41, heating this surface also to a high temperature. Because of the sloping character of this surface the gases are permitted to expand, thus further retarding their rate of flow outwardly beneath the utensil.

As above indicated the outer and inner sections 13ᵃ and 13ᵇ of the hearth are preferably made of a fused insulating material as, for example, a ceramic or refractory material. The use of such material is of substantial importance where the hearth closely underlies the bottom of the cooking utensil and is subjected to the intense heat of the burner flames. This is for the reason that such material constitutes a heat-storing medium which absorbs heat so slowly that even when the hearth is lapped by the burner flames so as to be subjected to the intense heat thereof, the speed of cooking is not materially affected. At the same time, the hearth absorbs heat slowly and gradually so that when the burner is turned off after a prolonged cooking operation, such heat is given up slowly to the cooking utensil, thereby keeping the contents of the utensil hot for a substantial period of time. It should be observed, however, that this result is obtained only because the hearth is positioned so as to be subjected to the intense heat of the burner flames and additionally is located so close to the utensil bottom as to be able to impart the heat stored therein to the utensil by radiation. While this result is particularly noticeable after the burner is turned off, it is obvious that the transmission of heat to the utensil by radiation also occurs while the burner is in operation.

Another factor of substantial importance in the use of a fused heat-insulating material resides in the provision of a top surface for the hearth structure which is impervious to the absorption of liquids and stains, which is capable of being cleaned easily, and which resists wear and abrasion. One of the most serious objections to gas cook stoves as commonly made is that the customarily used iron grates are unsightly in appearance even when new, particularly in contrast with the highly decorated porcelain-enamel finish employed in the sheet metal cabinet constituting the stove structure; and after the stove has been in use for any substantial period, the customarily used black porcelain enamel soon deteriorates at points contacted by the burner flames, leaving raw metal exposed.

In overcoming this objection, I employ in the present instance a ceramic material comprising a base or body capable of withstanding heat and impact shocks and provided on its exposed upper faces with a coating 41ª of vitric material. It is essential that the vitric coating be capable of withstanding extremely high temperatures without deterioration, and in order to assure this result the material is of such character as to be fusible upon the refractory base only at a temperature substantially in excess of that encountered in the use of the stove, it having been found, for example, that a material fusible at a temperature of 2500° F. is satisfactory.

In practice, the top panel 10 of the cooking top structure is provided with a coating of porcelain enamel so that the glazed surface of the hearth harmonizes with the top panel. To prevent injury to the finish of the top panel because of the conduction of an excessive amount of heat thereto, the hearth is made of a diameter somewhat less than the opening defined by the flange 12 so as to provide an annular passage 42 between the hearth and the flange for the flow of a cooling stream of air between the hearth and the panel.

In the construction shown in Figs. 4 to 6, the hearth is made partially of metal and partially of a ceramic material, and in this instance the top portion of the burner body is exposed. 43 designates a main burner with fuel emission ports 43ª and a central simmering burner 44, both being supplied with fuel through a conventional mixing tube 45. The hearth comprises an annular member 46 of cast metal surrounding the burner, a separately cast top ring 47, and a ring of fused heat-insulating material constituting an annular radiant 48. The member 46 is shaped to form an annular recess for receiving the radiant 48, and the top ring is removably secured to the member 46 in interlocking relation to the radiant. For this purpose the top ring 47 and member 46 are respectively provided with interlocking lugs 49 and 50 (Fig. 6), the arrangement being such that by a relative circumferential movement between the parts they may be disengaged. As herein shown the radiant 48 comprises a ceramic or refractory base having applied thereto a vitric coating as in the case of the hearth of Figs. 1 and 2.

The hearth is supported from the top panel 51 by means of a plurality of depending legs 52 cast integral with the top ring and engaging at their lower ends in indentations 53 formed in the bottom of an annular member constituting in the present instance a drip pan 54. In the present instance the outer edge portion of the pan is in the form of a marginal flange 54ª depending from and integral with the top panel. Air inlet slots 55 are provided between the upper edge of the pan and the top panel by cutting and pressing portions of the metal outwardly, leaving between them narrow supporting tongues 56 (Fig. 5).

When the hearth is supported in the manner above set forth, the lower edge of the member 46 forms with the annular burner body an air inlet slot 57; and between the outer edge of the top ring 47 and the top panel, an annular air slot 58. The inner edge of the pan is spaced radially outward from the member 46 so as to form a relatively large air passage for the admission of cool air over the top of the pan.

While the upper portion of the burner body is exposed in the present embodiment, the simmering burner 44 may be provided with a central radiant 59 in the form of a frusto conical member having a lower cylindrical portion fitting rather snugly within the simmering burner but formed with shallow grooves for the passage of a small amount of secondary air. At its upper end the radiant 59 terminates in a plane slightly above the plane of the fuel ports of the main burner and a short distance below the bottom of the utensil.

It will be seen that the upper end of the central radiant coacts with the burner body and with the outer hearth structure so as to form a combustion chamber beneath the bottom of a utensil resting on supports 50 which in the present instance are cast integral with the top ring, the parts being proportioned substantially as in the case of the form shown in Figs. 1 to 3, so as to confine a blanket of burning gases immediately beneath the utensil bottom. In addition to the utensil supports 60 auxiliary supporting members 61 are cast on the top ring to facilitate guiding the utensil onto the supports 60. Also, these auxiliary supports overlie the edge of the opening in the top panel but out of contact therewith and serve the additional function of resisting excess tilting movement of the hearth structure.

It will be observed that in this embodiment the radiant 48 forms the lower wall of the restricted outlet from the combustion chamber and that the radiant has its inner and upper surface formed to provide upwardly projecting teeth or ribs 62 which project at their upper ends into the paths of the flames discharging into the restricted outlet. Thus the outer portions of the flames impinge upon the ribs 62 and within a comparatively short time these ribs become heated to incandescence. Being disposed close to the bottom of the utensil they are effective in transferring the heat to the utensil, and they serve as baffles protecting the finish of the top ring 47. Additionally they serve to reduce the effective size of the restricted outlet passage so that the rate of flow of the burning gases outward beneath the cooking utensil is still further retarded. Such further retardation is rendered possible because of a more intimate commingling of the gases, the heating of the ribs to a high temperature, and therefore more complete combustion.

This application is a continuation in part of my copending application Serial No. 120,591, filed January 14, 1937, and my copending application Serial No. 235,961, filed October 20, 1938.

I claim as my invention:

1. In a cook stove, a gaseous fuel burner, a main top plate, a drip pan supported from said top plate below the plane thereof, and a hearth comprising an upright annular member interposed between the burner and said drip pan and a top ring extending outwardly from the upper end of said member and overlying the drip pan, means for supporting said hearth with said top ring substantially in the plane of the main top plate, and means for supporting a cooking utensil with its bottom walls spaced a short distance above the top ring, said top ring being spaced from the main top plate to form an air passage between them, and said drip pan having an air inlet opening at the inner edge thereof for the passage of air upwardly and outwardly between the drip pan and the top ring.

2. A gas cook stove comprising, in combination, a sheet metal top panel having an opening therein, a burner head positioned below and centrally of said opening, a drip pan beneath said opening, a utensil supporting structure comprising a ring having a plurality of utensil supports thereon, said drip pan together with said ring being supported from the top panel, and said drip pan having an outer peripheral portion extending downwardly from the edge of said opening in the top panel and apertured for the passage of air upwardly past said ring.

3. A gas cook stove comprising, in combination, a sheet metal top panel having an opening therein with a depending flange defining the edge of the opening, a burner head positioned centrally of the opening, means for supporting a cooking utensil above the burner head including a ring supported by said top panel, and a drip pan below said opening, said drip pan having a peripheral flange spaced from the flange on the top panel to form a passage for the flow of a cooling stream of air upwardly past said ring.

4. A gas cook stove comprising, in combination, a sheet metal top panel having an opening therein with a depending flange defining the edge of the opening, a round burner head positioned centrally of said opening and having fuel emission means in its upper portion, a hearth structure comprising a ring encircling the burner head and supported by said depending flange of the top panel, said ring presenting a wide upwardly facing top surface disposed substantially in the plane of the top panel, utensil supporting members integral with said ring and providing seating surfaces disposed in a plane substantially above the plane of the top panel, said burner head having a central opening for the passage of air upwardly therethrough, and a central utensil support carried by the burner head and adapted to cooperate with the utensil supporting members on said ring, said central support being constructed to permit the passage of air upwardly through the burner head.

5. A gas cook stove comprising, in combination, a sheet metal top panel with a porcelain enamel top coating, said panel having an opening therein and an annular member spaced below the edge of said opening, a burner positioned centrally of said opening, an annular supporting structure including an upwardly facing metallic ring carried by said member substantially in the plane of the top panel and having a plurality of utensil supports thereon, said ring having portions contacting said member only at points spaced apart circumferentially a substantial distance whereby to minimize conduction of heat from the utensil supports to said top panel, and an annulus of fused heat insulating material carried by said annular supporting structure and disposed in a position to be lapped by flames issuing upwardly and outwardly from said burner, said ring together with the utensil supports thereon being supported wholly out of contact with the porcelain coated surface of the top panel.

CLAUDE E. PARKER.